2 Sheets—Sheet 1.
G. Y. GRAY.
CRACKER MACHINE.
No. 89,985.              Patented May 11, 1869.
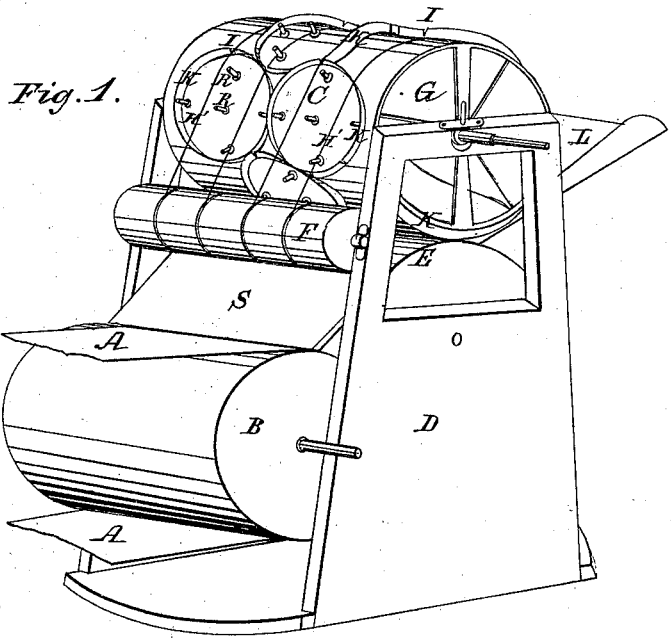
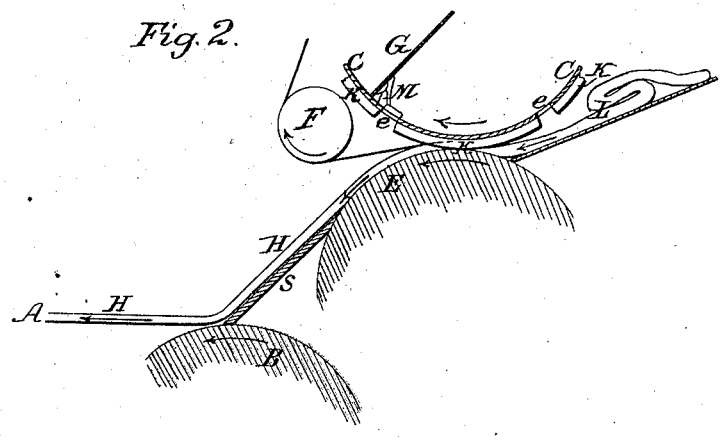
Witnesses
Samuel D. King
Perley Hale Jr.
Inventor.
Gordon Y. Gray.

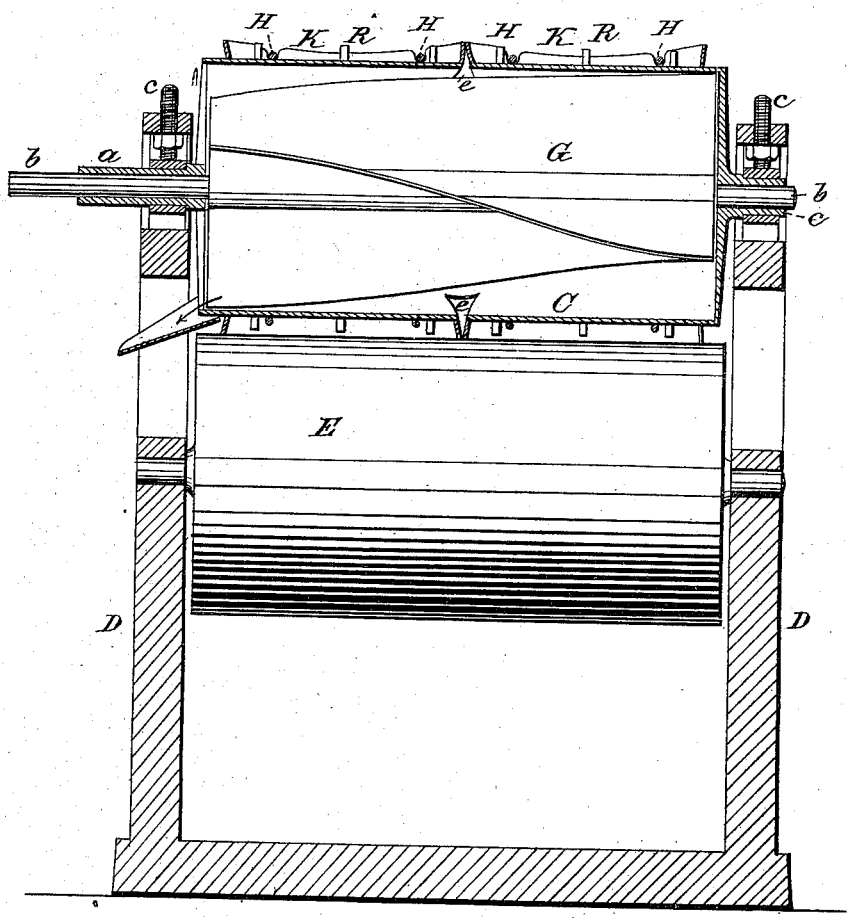

United States Patent Office.

GORDON Y. GRAY, OF NILES, MICHIGAN.

Letters Patent No. 89,985, dated May 11, 1869.

---

IMPROVED CRACKER-MACHINE.

---

The Schedule referred to in these Letters Patent and making part of the same.

---

*To all whom it may concern:*

Be it known that I, GORDON Y. GRAY, of Niles, in the county of Berrien, and State of Michigan, have invented certain new and useful Improvements in Machines for Cutting out Crackers, &c.; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to machines for cutting crackers and cakes from dough; and

It consists in providing a hollow cylinder with a set of cutting and perforating-devices, and also with perforations through which the surplus dough is forced into the interior of said cylinder, from whence it is removed by a screw; and in arranging a series of cords, to remove the crackers from the dies when cut; all as hereinafter explained.

Figure 1 is a perspective view of my improved machine;

Figure 2 is a transverse vertical section; and

Figure 3 is a longitudinal vertical section of the same.

To construct my machine, I provide a suitable frame, D, and mount thereon a hollow metallic cylinder, C, having arranged on its exterior surface a series of cutters, or dies, of the size and form that the cakes or crackers are intended to be, these cutters consisting of projecting rims, or flanges, K, placed as close together as they can be, as represented in fig. 1.

A series of pins, R, is arranged within each of the circles, or cutters, for perforating, or pricking the crackers; and there are recesses formed in the cutters, in such a manner as to pass around the cylinder C, for the reception of a small wire or cord, H, said wires or cords also passing around a roller, F, located below and in front of said cylinder C, as shown in fig. 1.

Perforations, e, are made through the shell of the cylinder C, of a size and form corresponding with the spaces between the cutters, where the latter come as near together as their form will admit, as represented in figs. 1 and 2, for the waste, or surplus dough to pass through, into the interior of the cylinder; and inside of the cylinder C is located a spiral-winged scraper, or screw, G, which serves to remove this surplus dough, and force it out at one end of the cylinder, as represented in figs. 1 and 3.

The journals b, of the screw, pass through, and have their bearings in the hollow journals a, of the cylinder C, and set-screws, c, are arranged for adjusting the cylinder C, and keeping it in contact with the surface of another cylinder, E, placed underneath the cutting-cylinder C, and against which the latter bears, as shown in figs. 1 and 3.

A hopper, or incline, L, is arranged in rear of the cylinder C, for receiving the dough, and feeding it to the cylinder; and in front is placed another slide, or incline, S, to receive the sheet of crackers as it passes from between the cylinders, and convey it to an endless apron, A, passing around rollers suitably located, as represented in fig. 2, these latter devices being in common use in similar machines, and, therefore, forming no part of my present invention.

The operation is as follows:

The machine being set in motion, a sheet of dough is placed on the incline L, and fed into the machine. As it passes through between the cylinders, it is cut into proper form by the cutters K, the pins R pricking, or perforating the crackers at the same time, the surplus dough between the cutters being forced through the openings e into the interior of the cylinder C, from whence it is removed by the screw G, which may be made to revolve in an opposite direction from the cylinder.

The crackers are held together by the small uncut portions in the recesses in the cutters, and as the cylinder revolves, the sheet of crackers is lifted out of the cutters by the cords H, which lie in said recesses, under the sheet of dough.

By this means, I make a machine that operates with great rapidity and success.

Having thus described my invention,

What I claim, is—

1. The hollow cylinder C, having a series of cutters mounted on its exterior surface, and having openings through the shell of the cylinder, in the spaces between the cutters, to permit the surplus dough to pass through into the interior of the cylinder, substantially as described.

2. The screw G, located within said cylinder C, and arranged to operate in connection therewith, substantially as and for the purpose set forth.

3. The combination, with cutting-cylinder C, of the wires or cords H, when arranged to operate as described, for the purpose of removing the crackers from the cutters, as set forth.

GORDON Y. GRAY.

Witnesses:
W. C. DODGE,
P. T. DODGE.